UNITED STATES PATENT OFFICE.

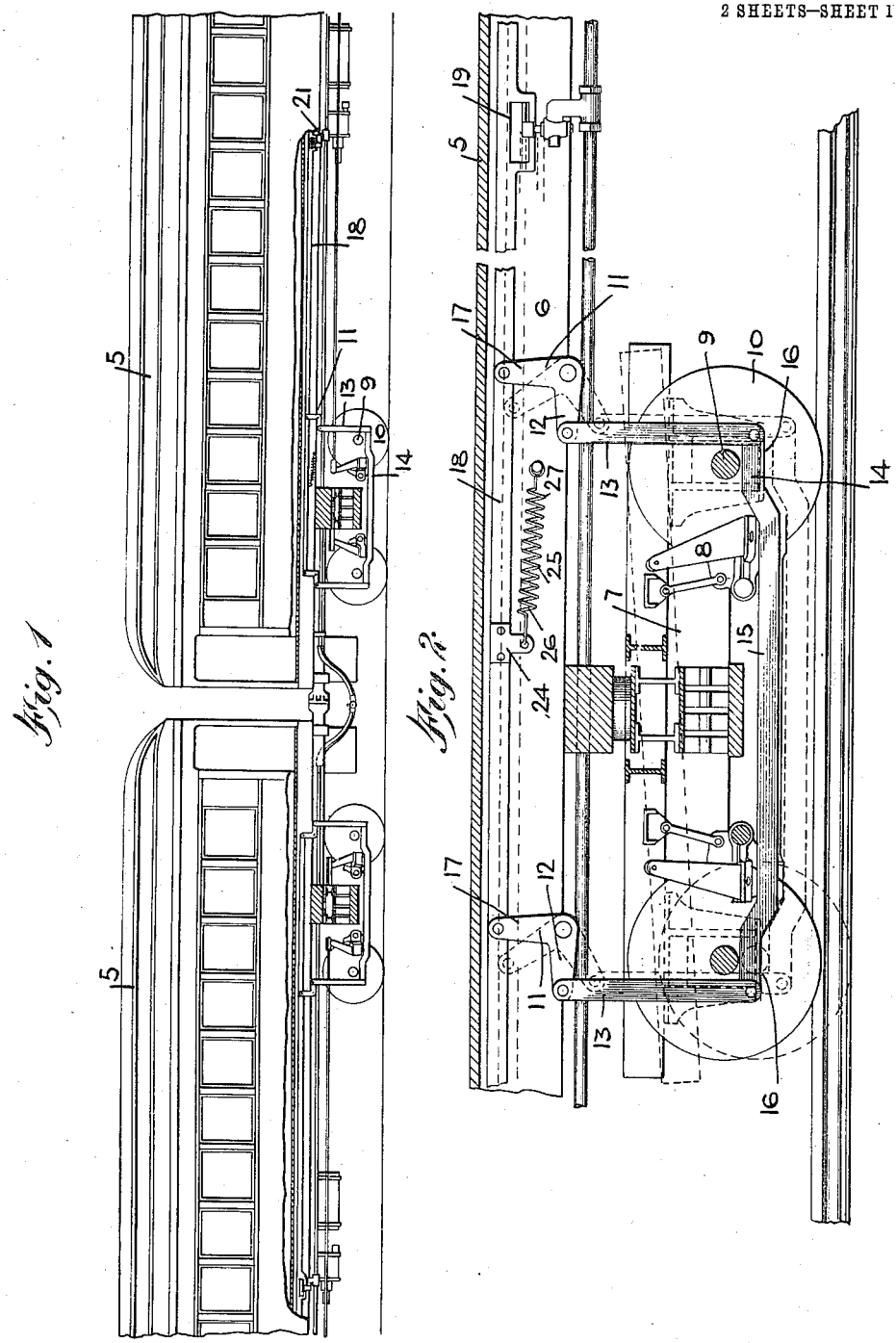

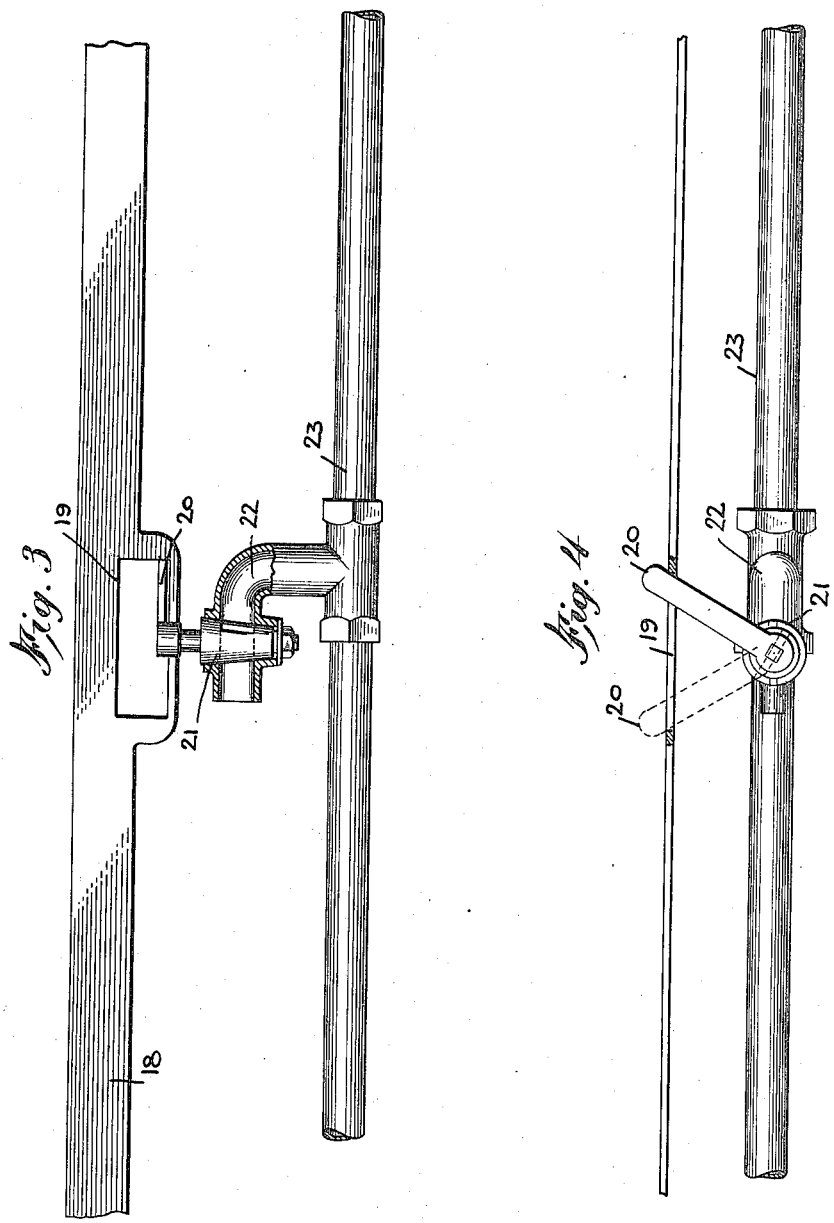

JOSEPH JUDGE, OF PITTSTON, PENNSYLVANIA.

AUTOMATIC BRAKE-VALVE MECHANISM FOR CARS.

1,059,876.      Specification of Letters Patent.      Patented Apr. 22, 1913.

Application filed July 2, 1912. Serial No. 707,169.

*To all whom it may concern:*

Be it known that I, JOSEPH JUDGE, a citizen of the United States, and a resident of Pittston, in the county of Luzerne and State of Pennsylvania, have invented a new and Improved Automatic Brake-Valve Mechanism for Cars, of which the following is a full, clear, and exact description.

My invention has for its object to provide a means for automatically opening a valve in the train pipe of a car when a truck on the said car is damaged.

Briefly, the invention consists of a member disposed below the axles of the truck and hung on arms of levers fulcrumed to the frame of the car, the other arms of the levers being pivoted to a rod having a slot in which the arm of the valve is disposed. When the truck is damaged or broken, when the axle is broken, when the wheel is broken or jumps the track, or when the track spreads or the rail is broken permitting the car wheel to fall to the ties, the axle will bear down on the member which will operate the valve through the levers and the rod to open the valve of the train pipe, thereby applying the brakes.

One embodiment of the invention is disclosed in the structure illustrated in the accompanying drawings forming part of this specification, in which like characters of reference indicate corresponding parts in all the views, and in which—

Figure 1 is a view showing portions of two cars coupled together and provided with my improvement; Fig. 2 is an enlarged sectional view of a portion of a car and car truck provided with my improvement; Fig. 3 is an enlarged view of the operating rod, the valve and the train pipe; and Fig. 4 is a plan view of Fig. 3 showing the operating rod in section.

By referring to the drawings it will be seen that the cars 5 are provided with frames 6, trucks 7 having brake levers 8, and axles 9 on which the car wheel 10 are mounted. Fulcrumed to the frames 6 there are bell-crank levers 11, two of these bell-crank levers being provided for each truck 7, one disposed in front and the other in the rear of the said truck. Pivoted to the arms 12 of the said levers there are links 13, a member 14 which is disposed longitudinally of the car and under the axles 9 having its terminals pivoted to the lower ends of the said links 13. This member 14 is disposed under and in close proximity to the axles 9 so that if the axles 9 move down out of normal position either through the breaking of the axle, the breaking of the car wheel, the breaking of the rail, or the damage of the track, the axle will bear down on the member 14 and through the links 13 operate one or both of the levers 11. This member 14 has the upper surface of its central portion 15 disposed below the upper surface of its terminals 16, so that the said member 14 will clear the brake beams. The member 14 being disposed below and in close proximity to the brake beams, should the brake beam become broken it will fall on the member 14 and move it downward to operate the links 13 and the levers 11 in the manner described.

Pivoted to the arms 17 of the levers 11 is an operating rod 18, this operating rod 18 having a slot 19 in which the arm 20 of the valve 21 is disposed, this valve 21 commanding the outlet 22 leading from the train pipe 23. A bracket 24 is secured to the operating rod 18, and to this bracket 24 there is secured a terminal 26 of the spring 25, the other terminal 27 of the said spring 25 being secured to the frame 6 of the car. It will therefore be seen that this spring 25 will normally hold the operating rod 18 in the position shown in Figs. 2, 3 and 4 of the drawings, but that when the arms 12 of the bell-crank levers 11 are moved downwardly by the downward movement of the member 14, to which they are connected by the links 13, the arms 17 of the said levers will be moved to the left against the tension of the spring 25 to move the arm 20 of the valve 21 into the position shown by the dotted lines in Fig. 4 of the drawings. This movement of the arm 20 of the valve 21 will open the valve 21 and permit the escape of the air from the train pipe 23, which will apply the brakes in a manner well understood. The spring will at all times tend to draw the operating rod 18 to the right and to the position shown in Fig. 4 of the drawings, but as will be seen by referring to Fig. 4 of the drawings when the operating rod 18 is moved to the right it will not move the arm 20 to close the valve 21, and the valve will remain open until it is closed manually by one of the crew of the train. It will therefore be seen that after the member 14 has been moved downward to apply the brakes the valve 21 will not be automatically closed by the removal of the weight from the member 14.

Having thus described my invention, what I claim as new and desire to secure by Letters Patent is:—

1. In combination with a car having a frame, a truck and a train pipe, a member disposed under the truck, a rod having a slot, means by which the member is adapted to operate the rod, and a valve connected with the train pipe, and provided with a stem normally positioned in the slot, for moving freely toward one end of the slot, and adapted to be operated by the other end of the slot when the rod is moved in one direction.

2. In combination with a car having a truck, and a train pipe, a member disposed under the truck, a rod having a slot, means by which the downward movement of the member will operate the rod, and a valve connected with the train pipe and provided with a stem, normally positioned in the slot for moving freely toward one end of the slot, and adapted to be operated by the other end of the slot when the rod is operated by the downward movement of the member.

3. In combination with a car having a frame, a truck and a train pipe, a member disposed under the truck, levers fulcrumed to the frame, means connecting the member with the levers, a rod connected with the levers and provided with a slot, a valve connected with the train pipe and provided with an operating arm disposed in the slot, and a spring for holding the rod yieldingly in a predetermined position.

4. In combination with a car having a truck and a train pipe, a valve connected with the train pipe, a member normally spaced from the truck and adapted to be operated by contact therewith, links for supporting the member, two bell-crank levers having one set of arms normally disposed horizontally and to which the links are articulated, the other set of arms of the bell-crank levers being disposed upwardly, a rod articulated to the other set of arms, a spring for holding the rod yieldingly in a predetermined position, and means by which the rod is adapted to operate the valve.

In testimony whereof I have signed my name to this specification in the presence of two subscribing witnesses.

JOSEPH JUDGE.

Witnesses:
GEORGE JUDGE,
RALPH BOWKLEY.